United States Patent
Okabe (10) Patent No.: US 8,925,599 B2
(45) Date of Patent: Jan. 6, 2015

(54) HEAVY DUTY TIRE

(71) Applicant: Sumitomo Rubber Industries, Ltd., Kobe-shi, Hyogo (JP)

(72) Inventor: Taro Okabe, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 274 days.

(21) Appl. No.: 13/644,798

(22) Filed: Oct. 4, 2012

(65) Prior Publication Data

US 2013/0092302 A1  Apr. 18, 2013

(30) Foreign Application Priority Data

Oct. 14, 2011 (JP) ................................. 2011-227120

(51) Int. Cl.
| | | |
|---|---|---|
| *B60C 11/01* | (2006.01) | |
| *B60C 11/04* | (2006.01) | |
| *B60C 11/03* | (2006.01) | |
| *B60C 11/00* | (2006.01) | |

(52) U.S. Cl.
CPC .............. *B60C 11/01* (2013.01); *B60C 11/0058* (2013.04); *B60C 11/0332* (2013.04); *B60C 2011/013* (2013.04); *B60C 2200/06* (2013.04); *B60C 2011/0025* (2013.04); *B60C 2011/0348* (2013.04); *B60C 2011/016* (2013.04)
USPC .............. 152/209.16; 152/209.5; 152/209.27

(58) Field of Classification Search
CPC .............. B60C 2011/0348; B60C 2011/0025; B60C 11/0041; B60C 11/0058; B60C 2200/06; B60C 11/00; B60C 11/0008; B60C 11/005; B60C 11/0066; B60C 11/0075; B60C 2011/0016; B60C 2011/0033
USPC .............................. 152/209.16, 209.5, 209.27
See application file for complete search history.

(56) References Cited

U.S. PATENT DOCUMENTS 4,480,671 A * 11/1984 Giron ........................ 152/209.14
4,890,658 A * 1/1990 Kabe et al. ................ 152/209.27
(Continued)

FOREIGN PATENT DOCUMENTS

EP          285695 A * 10/1988 .............. B60C 11/00
JP       01212602 A *  8/1989 .............. B60C 11/00
(Continued)

OTHER PUBLICATIONS

Machine Translation: JP2002-307911; Nakamura et.; no date.*

(Continued)

*Primary Examiner* — Justin Fischer
*Assistant Examiner* — Kendra Shin
(74) *Attorney, Agent, or Firm* — Birch, Stewart, Kolasch & Birch, LLP (57) ABSTRACT

A heavy duty tire comprises a tread portion provided with belt plies and circumferentially-extending main grooves, wherein a shoulder rib area between the axially outermost shoulder main groove and a tread edge is subdivided by a sub groove into an axially inner main rib zone and an axially outer sub rib zone. The main rib zone is provided with a high elastic modulus rubber layer extending along the axially outer edge of the main rib zone to form a part of the tread face and made of rubber having an elastic-modulus higher than that of rubber forming the tread face except for said part of the tread face. The axial width (W1a) of the high elastic modulus rubber layer is 0.3 to 0.6 times the axial width (W1) of the main rib zone.

4 Claims, 5 Drawing Sheets

(56) References Cited

U.S. PATENT DOCUMENTS

| | | | |
|---|---|---|---|
| 5,769,978 A * | 6/1998 | Lurois | 152/209.18 |
| 6,213,181 B1 * | 4/2001 | Janajreh | 152/209.5 |
| 6,722,408 B2 * | 4/2004 | Naito | 152/209.14 |
| 8,028,731 B2 * | 10/2011 | Boiocchi et al. | 152/209.1 |
| 2002/0157747 A1 * | 10/2002 | Shimada et al. | 152/209.5 |
| 2004/0050470 A1 * | 3/2004 | Nishi | 152/209.5 |
| 2007/0151643 A1 | 7/2007 | Takahashi | |
| 2007/0295433 A1 * | 12/2007 | Losi et al. | 152/209.5 |
| 2008/0216941 A1 * | 9/2008 | Lacagnina et al. | 156/110.1 |
| 2009/0294001 A1 * | 12/2009 | Weber et al. | 152/209.5 |
| 2010/0096060 A1 * | 4/2010 | Suzuki | 152/531 |
| 2010/0269967 A1 * | 10/2010 | Maruoka | 152/209.16 |

FOREIGN PATENT DOCUMENTS

| | | | | |
|---|---|---|---|---|
| JP | 02249707 A | * | 10/1990 | B60C 11/00 |
| JP | 2002307911 A | * | 10/2002 | B60C 11/00 |
| JP | 2007-182099 A | | 7/2007 | |
| JP | 2009132179 A | * | 6/2009 | B60C 11/00 |

OTHER PUBLICATIONS

Machine Translation:JP2009-132179; Nagano, Daijiro; no date.*
Summary: JP02249707; Ohashi et al.; no date.*

* cited by examiner

HEAVY DUTY TIRE

BACKGROUND OF THE INVENTION

The present invention relates to a heavy duty tire, more particularly to a ribbed tread capable of improving uneven wear in the shoulder rib areas and the rolling resistance of the tire.

Figure 4A:
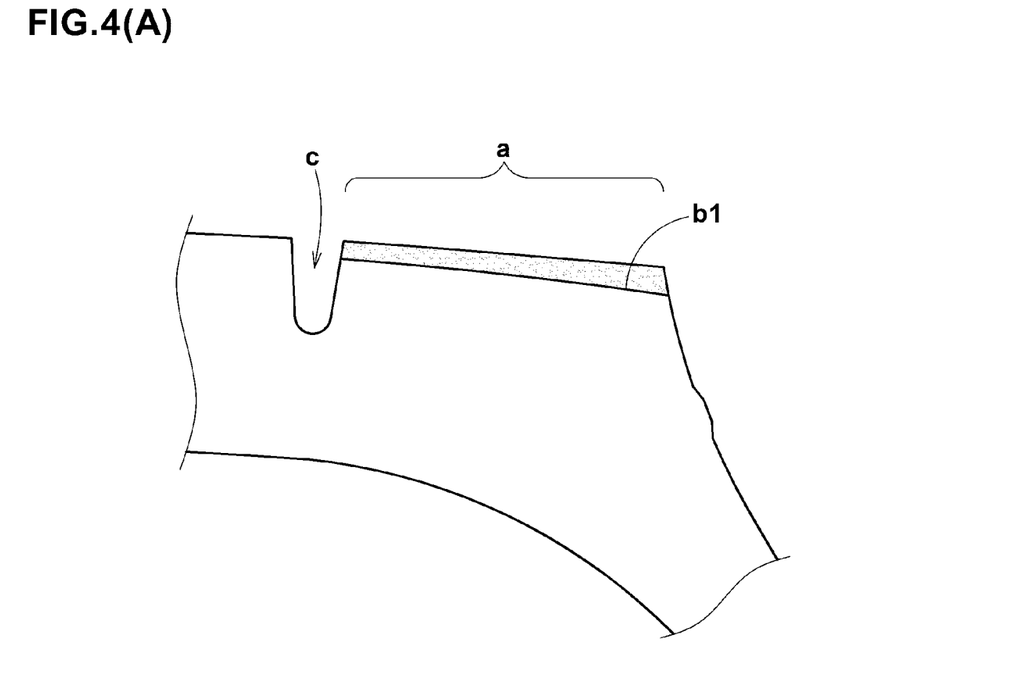
FIG. 4(A) is a cross sectional view of a tread shoulder portion for explaining shoulder wear.

In the heavy duty tires, so called shoulder wear (b1) is liable to occur such that the shoulder rib area (a) of the tread wears in a concentrated manner as shown in FIG. 4(A).
The reason for the shoulder wear (b1) is that the rolling radius of the tire is smaller in the shoulder rib areas (a) than in the tread crown area. Thus, the ground pressure in the shoulder rib area (a) becomes relatively low, and the circumferential length of the ground contacting part of the shoulder rib area becomes relatively short. As a result, the amount of slippage between the tread surface and the road surface during rolling becomes larger in the shoulder rib areas (a), and local wear is caused in the shoulder rib areas (a) in a concentrated manner.

Japanese Patent Application Publication No. 2007-182099 proposed that the shape of the footprint of the tire is optimized so that the ground pressure is increased in a tread edge side thereof and thereby the shoulder wear can be reduced.

Figure 4B:
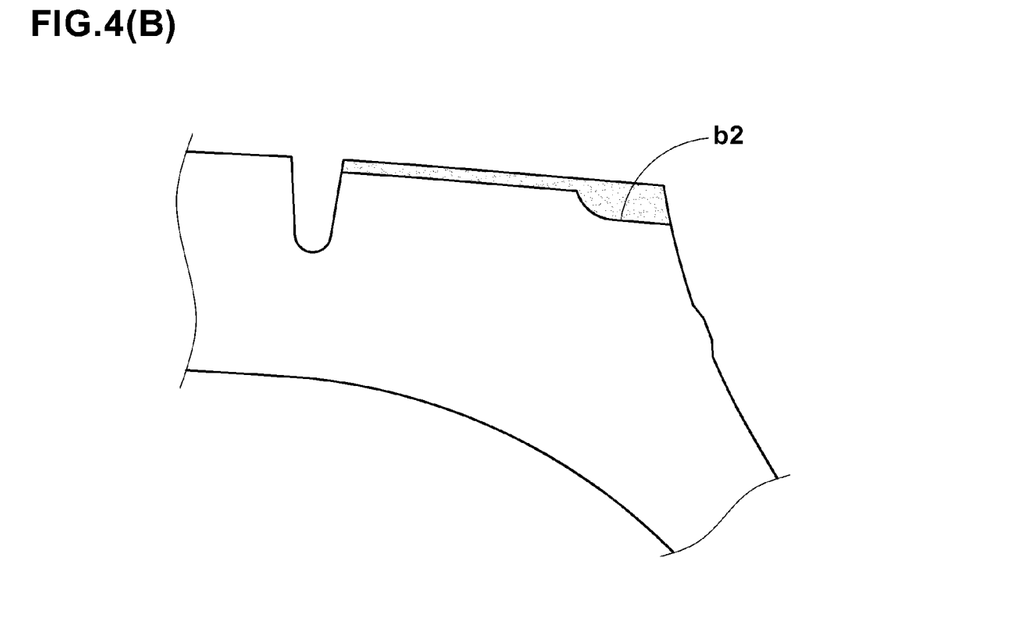
FIG. 4(B) is a cross sectional view of a tread shoulder portion for explaining step wear.

If the ground pressure is increased in the tread edge side, another problem so called step wear b2 such that only the vicinity of the tread edge wears rapidly is liable to occur as shown in FIG. 4(B).

Figure 5:
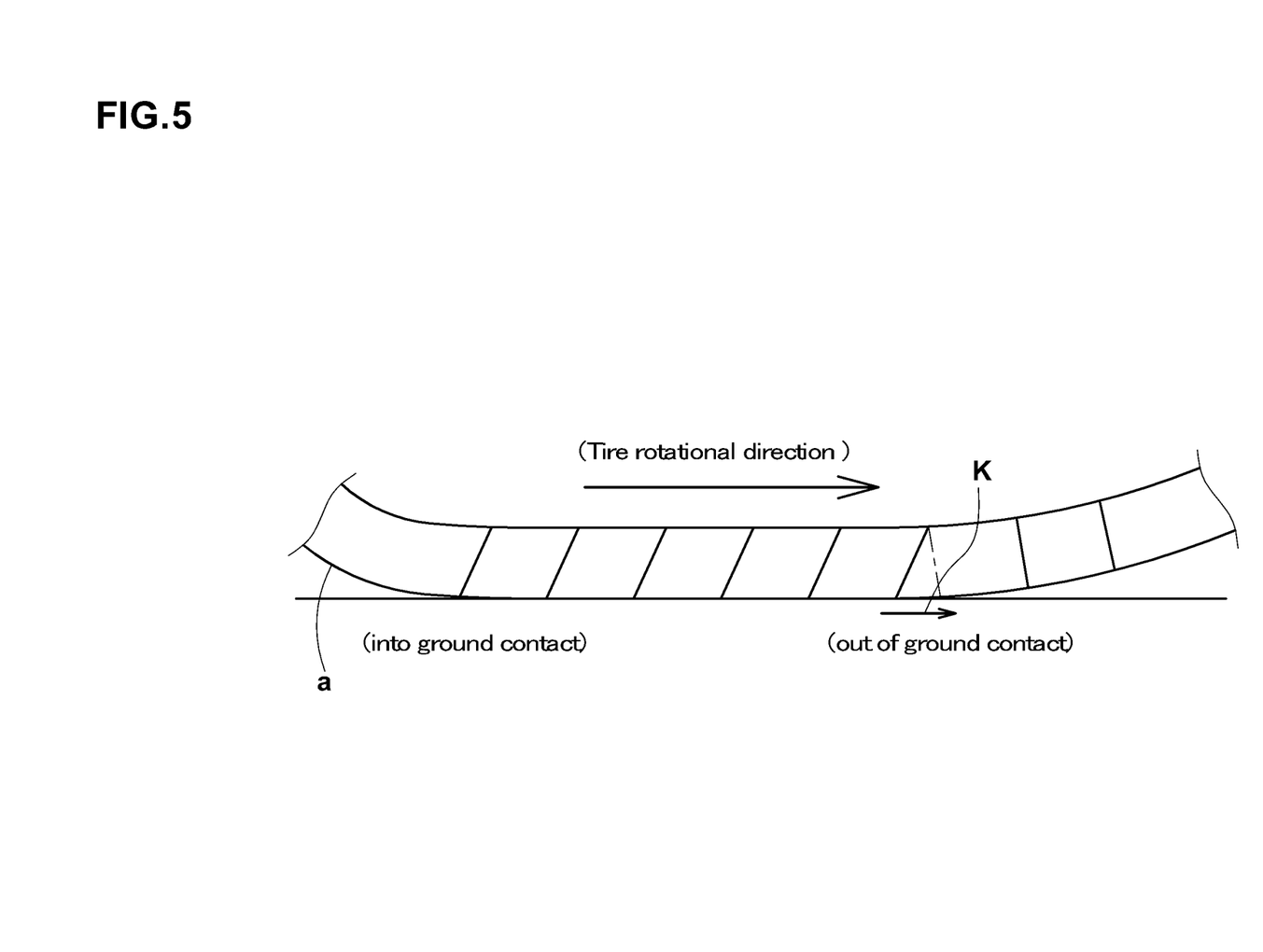
FIG. 5 is a diagram for explaining a mechanism of the occurrence of step wear.

FIG. 5 schematically shows a contact between the shoulder rib area (a) and the road surface.
When the ground pressure is relatively high in the tread edge side, the shoulder rib area (a) is subjected to a sharing deformation at the position "into ground contact", and this deformed part subjected to the sharing deformation relatively moves to the position "out of ground contact" as the tire rotates, while keeping the sharing deformation.
At the position "out of ground contact", since the ground pressure is decreased, the deformed part restores abruptly to its original state. Therefore, between this restoring part and the road surface, an instantaneous slippage K occurs, and as a result, the step wear b2 is caused.

Meanwhile, in order to reduce the rolling resistance of tires and thereby to reduce fuel consumption of automobiles, low-heat-buildup rubber compounds having less hysteresis loss are recently widely used as tread rubber and cap tread rubber (as the outermost rubber layer).
The low-heat-buildup rubber compounds are generally inferior in wear resistance, therefore, if such rubber compound is used as the outermost rubber layer of the tread portion, the shoulder wear and step wear are more liable to occur. Thus, there is a problem such that the tread wear life is decreased.

SUMMARY OF THE INVENTION

It is therefore, an object of the present invention to provide a heavy duty tire in which the rolling resistance can be improved while preventing or reducing the shoulder wear and step wear in the shoulder rib areas.

According to the present invention, a heavy duty tire comprises
a carcass extending between bead portions through a tread portion and sidewall portions, and
a belt disposed radially outside the carcass in the tread portion and composed of a plurality of belt plies including a radially innermost first belt ply and a widest second belt ply disposed on the radially outside of the first belt ply, the tread portion provided with a plurality of circumferentially-extending main grooves including an axially outermost shoulder main groove disposed on each side of the tire equator to define a shoulder rib area between the shoulder main groove and the adjacent tread edge, and a crown area between the axially outermost shoulder main grooves, and the shoulder rib area is provided with a sub groove extending straight in the tire circumferential direction at an axial distance of 0.05 to 0.2 times the axial width Wr of the shoulder rib area from the tread edge so as to subdivide the shoulder rib area into a main rib zone axially inside the sub groove and a sub rib zone axially outside the sub groove, wherein the main rib zone is provided with a high elastic modulus rubber layer extending along the axially outer edge of the main rib zone to form a part of the tread face and made of rubber having an elastic-modulus higher than that of rubber forming the tread face except for the above-mentioned part of the tread face, the axial width (W1a) of the high elastic modulus rubber layer is 0.3 to 0.6 times the axial width (W1) of the main rib zone, the thickness (Ta) of the high elastic modulus rubber layer is 0.1 to 0.5 times a radial distance (T) from the axially outer edge of the main rib zone to the axial edge of the second belt ply, and under such a condition that the tire mounted on a standard wheel rim, inflated to a standard pressure and load with a standard load is placed on a horizontal plane at a camber angle of 0 degree, an average ground pressure (P1A) of the high elastic modulus rubber layer is in a range of 0.85 to 0.95 times an average ground pressure (P1B) of the crown area.

Preferably, the depth (D1) of the sub groove is in a range of 0.6 to 1.0 times the depth (D2) of the shoulder main groove. Preferably, the radially outer surface of the sub rib zone extends parallel with a virtual tread surface while keeping a distance (d) of 1.5 to 3.5 mm radially inwardly from the virtual tread surface, wherein the virtual tread surface is defined as an extension of the radially outer surface of the main rib zone. The axial distance (Le) between the axially outer edge of the main rib zone and the axial edge of the second belt ply is preferably not more than 5% of the axial distance (Wt) between the axially outer edge of the main rib zone and the tire equator.

Therefore, the average ground pressure P1A of the high elastic modulus rubber layer is set in a higher range in relation to the average ground pressure P1B. As a result, the occurrence of shoulder wear in the shoulder rib areas can be prevented. Further, the step wear induced by the high average ground pressure P1A is prevented by providing the sub groove and high elastic modulus rubber layer.
More specifically, the width of the sub rib zone is narrow and the ground pressure of the sub rib zone is low, therefore, the sub rib zone can be moved easily and slippage easily occurs between the sub rib zone and road surface.
As a result, wear concentrates on the sub rib zone, in other words, the sub rib zone functions as a sacrifice for wear, and thereby the shoulder wear in the main rib zone can be reduced.
On the other hand, a lateral force which the main rib zone receives during cornering is reduced by the sub rib zone and thereby the increase in the ground pressure near the axially outer edge of the main rib zone can be prevented. As a result, the main rib zone can be prevented from step wear.

The high elastic modulus rubber layer can decrease the amount of sharing deformation shown in FIG. 5 owing to its high modulus. Further, the high elastic modulus rubber layer is relatively hard to wear. Therefore, the step wear in the main rib zone can be effectively prevented.

Thus, in the heavy duty tire according to the present invention, low-heat-buildup rubber compounds can be employed in the tread rubber in a single-layered tread structure or the cap tread rubber in a cap-base tread structure, excepting the high elastic modulus rubber layer. Accordingly, the rolling resistance can be improved, while preventing the shoulder wear and step wear.

According to the present invention, the average ground pressure ratio P1A/P1B is set at a relatively larger value to increase the tendency toward step wear, and then the high elastic modulus rubber layer is provided to prevent the step wear. Therefore, it is possible to decrease the width of the high elastic modulus rubber layer.

If the ratio P1A/P1B is set at a relatively smaller value to increase the tendency toward shoulder wear, then it is necessary for the high elastic modulus rubber layer to extend over the entire width of the main rib zone. Therefore, the effect to improve the rolling resistance performance becomes decreased.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load capacity" in ETRTO, the maximum value given in the above-mentioned table in TRA or the like.

The tread edges are the axial outermost edges of the ground contacting patch (camber angle=0) in the normally inflated loaded condition.

DESCRIPTION OF THE PREFERRED EMBODIMENTS

Figure 1:
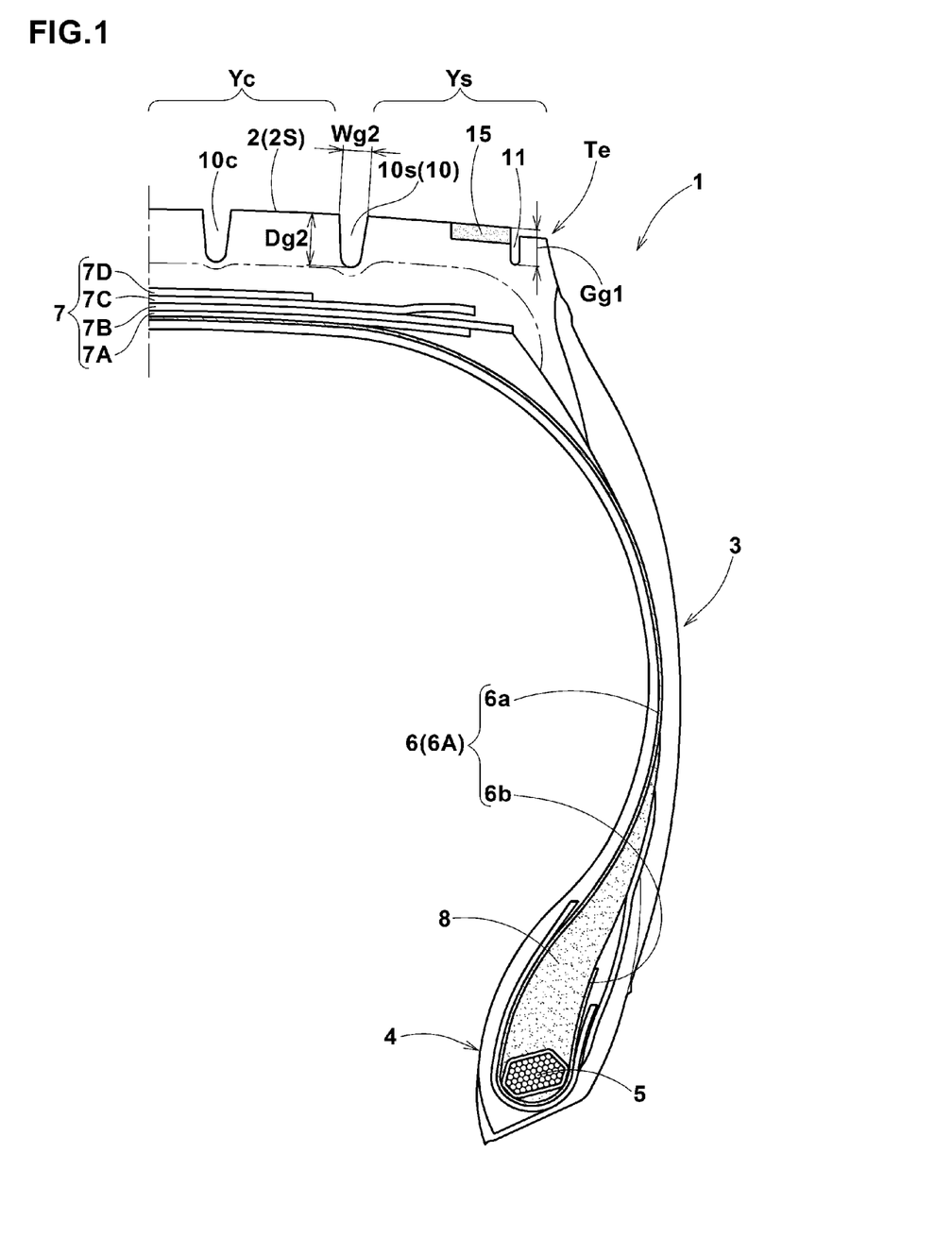
FIG. 1 is a cross sectional view of a heavy duty tire as an embodiment of the present invention.

Embodiments of the present invention will now be described in detail in conjunction with accompanying drawings As shown in FIG. 1, the heavy duty tire 1 according to the present invention comprises a tread portion 2, a pair of axially spaced bead portions 4 each with a bead core 5 therein, a pair of sidewall portions 3 extending between the tread edges and the bead portions 4, a carcass 6 extending between the bead portions 4, and a belt 7 disposed radially outside the carcass 6 in the tread portion 2.

The carcass 6 is composed of at least one ply 6A of cords arranged radially at an angle in the range of from 75 to 90 degrees with respect to the tire circumferential direction, extending between the bead portions 4 through the tread portion 2 and sidewall portions 3 and turned up around the bead core 5 in each bead portion 4 from the axially inside to the axially outside of the tire to form a pair of turnup portions 6b and a main portion 6a therebetween.

In this embodiment, the carcass 6 is composed of a single ply 6A of the cords arranged radially at an angle of 90 degrees.

In each of the bead portion 4, a bead apex rubber 8 having a triangular cross sectional shape and extending radially outwardly from the bead core 5 is disposed to reinforce the bead portion 4 and a lower sidewall portion.

The belt 7 is composed of belt plies each made of parallel belt cords. The belt plies include at least a radially innermost first belt ply 7A and a second belt ply 7B disposed on the radially outside of first belt ply 7A.

The belt 7 in this example is composed of the first belt ply 7A, the second belt ply 7B, a third belt ply 7C disposed on the radially outside of the second belt ply 7B, and a fourth belt ply 7D disposed on the radially outside of the third belt ply 7C. The belt cords of the first belt ply 7A are laid at an angle in a range of from 45 to 70 degrees with respect to the tire circumferential direction. The belt cords of each of the second-fourth belt plies 7B-7D are laid at an angle in a range of from 10 to 35 degrees with respect to the tire circumferential direction.

With respect to the tire circumferential direction, the inclining direction of the belt cords of the second belt ply 7B is opposite to the inclining direction of the belt cords of the third belt ply 7C in order to increase the belt rigidity and thereby to stiffen the tread portion 2.

The second belt ply 7B is widest and extends substantially parallel with the tread face 2S.

In order to avoid stress concentration and thereby to prevent a ply edge separation, the first and third belt plies 7A and 7C are made 5 to 15 mm narrower than the second belt ply 7B.

According to the present invention, the tread portion 2 is provided with circumferentially continuously extending main grooves 10 including a pair of axially outermost shoulder main grooves 10s to define a crown area Yc between the two shoulder main grooves 10s and a pair of shoulder rib areas Ys between the shoulder main grooves 10s and the tread edges Te.

The main grooves 10 each have a width Wg2 of not less than 4.0 mm, preferably not less than 7.0 mm and preferably not more than 12.0 mm, and a depth Dg2 of preferably not less than 12.0 mm and preferably not more than 16.0 mm.

The tread portion in this embodiment is provided with a total of four main grooves 10 which are the two shoulder main grooves 10s and two additional crown main grooves 10c disposed therebetween. However, the invention is not limited to this embodiment. The tread portion 2 may be provided with a total of three main grooves 10 including one additional crown main groove 10c, or a total of five main grooves 10 including three additional crown main grooves 10c for example.

Figure 3:
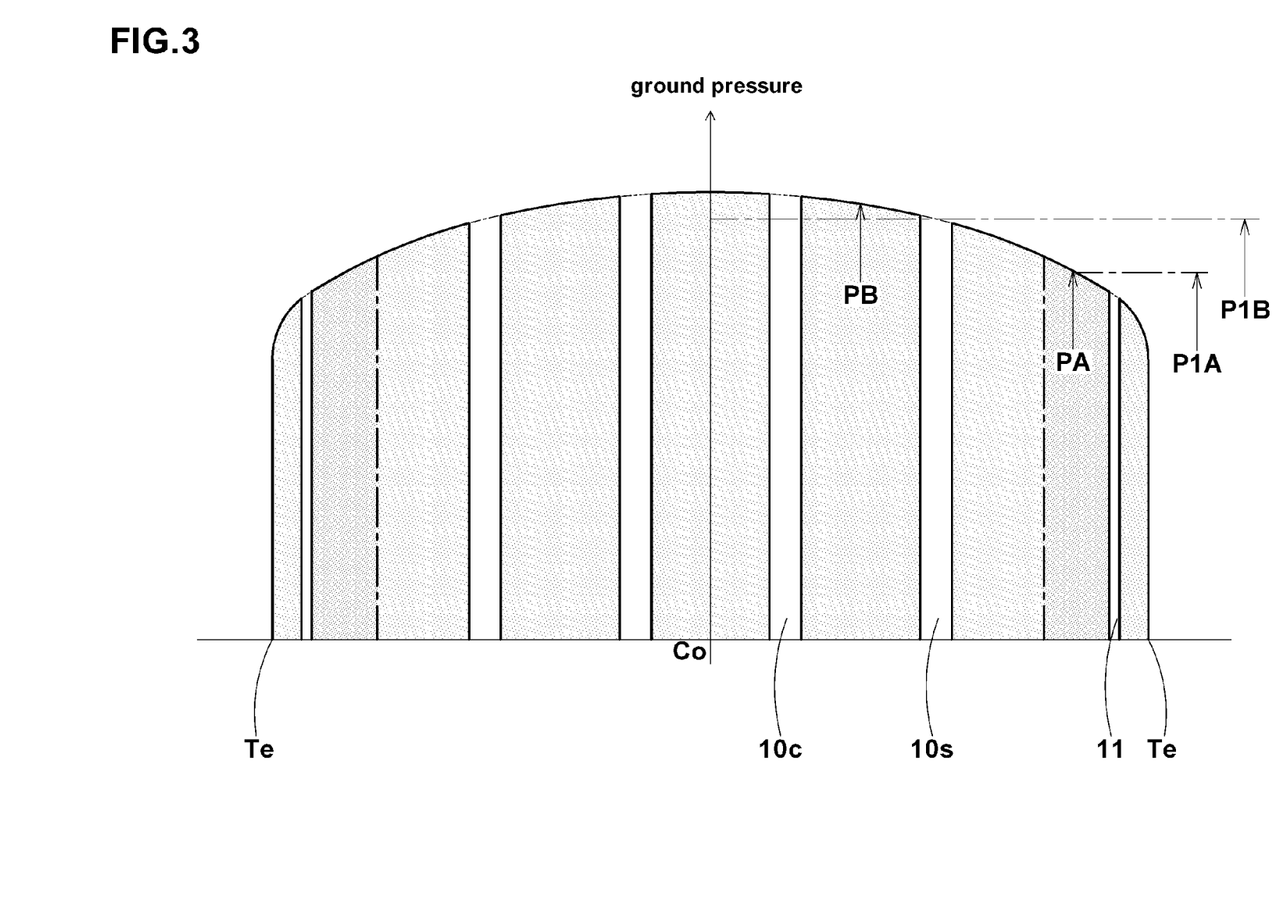
FIG. 3 is a graph showing a ground pressure distribution for explaining the average ground pressure.

As shown in FIG. 3, each of the shoulder rib areas Ys is provided with a sub groove 11 extending straight in the circumferential direction to subdivide the shoulder rib area Ys into a main rib zone 12 on the axially inside of the sub groove 11 and a sub rib zone 13 on the axially outside of the sub groove 11.

The sub groove 11 is a relatively narrow groove having a width Wg1 of less than 3.0 mm.

the axial distance from the tread edge Te to the sub groove 11 is set in a range of from 0.05 to 0.2 times the axial width Wr of the shoulder rib area Ys. In other words, the axial width W2 of the sub rib zone 13 is set in a range of from 0.05 to 0.2 times the axial width Wr.

Figure 2:
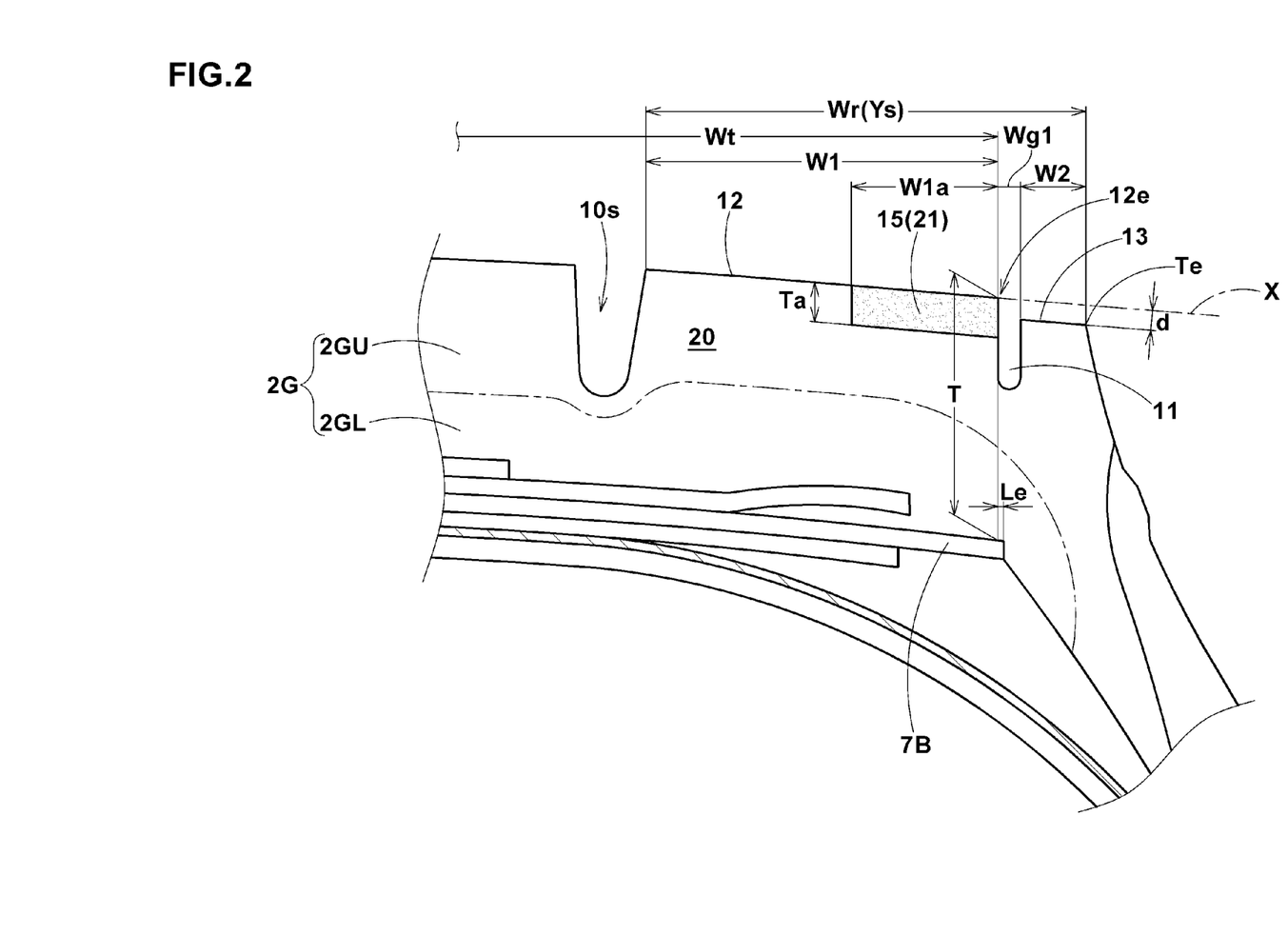
FIG. 2 is an enlarged cross sectional view of the tread shoulder portion thereof.

The main rib zone 12 is provided with a high elastic modulus rubber layer 15 of which radially outer surface forms a part of the tread face 2S.

The high elastic modulus rubber layer 15 is made of a rubber compound 21 having a higher elastic modulus than a rubber compound 20 forming the tread face 2S excepting the part formed by the high elastic modulus rubber layer 15.

In this embodiment, the tread rubber 2G has a cap-base structure comprising a radially outer cap tread rubber 2GU and a radially inner base tread rubber 2GL.

The cap tread rubber 2GU includes the high elastic modulus rubber layers 15. Excepting the high elastic modulus rubber layers 15, the cap tread rubber 2GU is made of the rubber compound 20.

The high elastic modulus rubber layer 15 extends circumferentially of the tire along the axially outer edge 12e of the main rib zone 12.

The axial width W1a of the high elastic modulus rubber layer 15 is set in a range of not less than 0.3 times, preferably not less than 0.45 times, but not more than 0.6 times, preferably not more than 0.55 times the axial width W1 of the main rib zone 12.

The thickness Ta of the high elastic modulus rubber layer 15 is set in a range of not less than 0.1 times, preferably not less than 0.3 times, but not more than 0.5 times, preferably not more than 0.35 times the radial distance T from the axially outer edge 12e to the axial edge of the second belt ply 7B. Here, the second belt ply 7B extends to a position beneath the sub groove 11 as shown in FIG. 1.

Further, in this embodiment, as shown in FIG. 3, the average ground pressure P1A in the high elastic modulus rubber layer 15 is set in a range of not less than 0.85 times, preferably not less than 0.87 times, but not more than 0.95 times, preferably not more than 0.93 times the average ground pressure P1B in the crown area Yc.

The average ground pressure P1A and P1B is obtained as follows. The heavy duty tire 1 is placed on a flat horizontal plane at a camber angle of 0 degree under the above-mentioned normally inflated loaded condition. And the ground pressure is measured along a straight line drawn parallel with the tire axial direction passing through the center in the tire circumferential direction of the footprint of the tire at the tire equator.

Then, the mean value of the ground pressure PA in the high elastic modulus rubber layer 15 is calculated as the average ground pressure P1A. The mean value of the ground pressure PB in the crown area Yc is calculated as the average ground pressure P1B. Here, in the calculation of the mean value, the positions where the main grooves are disposed are passed over since the ground pressure is zero.

Incidentally, the average ground pressure ratio P1A/P1B can be adjusted by changing the contour shape of the tread face 2S.

If the average ground pressure ratio P1A/P1B becomes less than 0.85, the step wear can be reduced, but the shoulder wear can not be reduced. If the average ground pressure ratio P1A/P1B becomes more than 0.95, the shoulder wear can be reduced, but the step wear can not be reduced.

If the width W2 of the sub rib zone 13 becomes less than 0.05 times the width Wr of the shoulder rib area Ys, then the strength of the sub rib zone 13 becomes too small, and there is a possibility that the sub rib zone is torn off during running. If the width W2 becomes more than 0.2 times the width Wr, then the rigidity of the sub rib zone 13 is increased and does not function as the sacrifice for wear. Further, the lateral force during cornering can not be fully reduced and the effect to reduce the ground pressure of the main rib zone 12 near the axially outer edge thereof becomes lowered. Therefore, both of the step wear and shoulder wear become worse.

If the width W1a of the high elastic modulus rubber layer 15 is less than 0.3 times the width W1 of the main rib zone 12, or if the thickness Ta of the high elastic modulus rubber layer is less than 0.1 times the radial distance T, then the high elastic modulus rubber layer 15 is worn away during the initial stage of the tread wear life and it becomes difficult to prevent the step wear.

If the width W1a is more than 0.6 times the width W1, or if the thickness Ta is more than 0.5 times the radial distance T, then it becomes difficult to improve the rolling resistance and fuel consumption performance.

Preferably, the rubber compound 21 of the high elastic modulus rubber layer 15 has a complex elastic modulus $E^*1$ in a range of from 5.55 to 5.75 MPa.

The loss tangent1 of the rubber compound 21 is preferably set in a range of from 0.108 to 0.122.

If the complex elastic modulus $E^*1$ is less than 5.55 MPa, there is a tendency that the reduction of the amount of sharing deformation and the wear resistance of the rubber become insufficient, and as a result, the effect to prevent the step wear becomes insufficient.

If the complex elastic modulus $E^*1$ is more than 5.75 MPa, there is a tendency that the rolling resistance can not be effectively improved.

Preferably, the rubber compound 20 has a complex elastic modulus $E^*2$ in a range of from 4.95 to 5.45 MPa.

The loss tangent2 of the rubber compound 20 is preferably set in a range of from 0.068 to 0.082.

If the complex elastic modulus $E^*2$ is less than 4.95 MPa, the tread face 2S formed by the rubber compound 20 wears rapidly and the tread wear life is shortened.

If the complex elastic modulus $E^*2$ is more than 5.45 MPa, it becomes difficult to improve the rolling resistance.

The complex elastic modulus $E^*$ and loss tangent are measured according to the Japanese Industrial standard JIS-K6394 under initial strain of 10%, amplitude of +/−1%, frequency of 10 Hz, and temperature of 70 deg.C. using a tensile strain mode of a viscoelastic spectrometer manufactured by Iwamoto Seisakusyo KK.

In order to effectively derive the advantageous effect of the sub rib zone 13, the depth D1 of the sub groove 11 is preferably set in a range of from 0.6 to 1.0 times the depth D2 of the shoulder main groove 10s.

If the virtual tread surface X is defined as an extension of the radially outer surface of the main rib zone 12, it is preferable that the radially outer surface of the sub rib zone 13 extends parallel with the virtual tread surface X at a distance (d) of 1.5 to 3.5 mm radially inward from the virtual tread surface X.

If the depth D1 of the sub groove 11 is less than 0.6 times the depth D2, then the rigidity of the sub rib zone 13 is increased and it becomes difficult to function as the sacrifice for wear. Further, it becomes difficult to decrease the lateral force which the main rib zone 12 receives during cornering. Therefore, there is a tendency that both of the step wear and shoulder wear become worse.

If the depth D1 is more than 1.0 times the depth D2, then the strength of the sub rib zone 13 becomes insufficient, and there is a possibility that the sub rib zone is torn off during running.

If the distance (d) is less than 1.5 mm, then the effect to reduce the ground pressure of the main rib zone 12 near the axially outer edge thereof becomes lowered.

If the distance (d) is more than 3.5 mm, then the sub rib zone 13 can not contact with the ground and does not function as the sacrifice for wear.

In other words, when the heavy duty tire 1 is placed on a flat horizontal plane at a camber angle of 0 degree under the above-mentioned normally inflated loaded condition, the radially outer surface of the sub rib zone 13 needs to contact with the horizontal plane.

Preferably, the axial distance Le between the axially outer edge 12e of the main rib zone 12 and the axial edge of the second belt ply 7B is not more than 5% of the axial distance Wt from the tire equator Co to the axially outer edge 12e.

If the axial distance Le is more than 5% of the axial distance Wt and the axial edge of the second belt ply 7B is axially inside the axially outer edge 12e, then the ground pressure is decreased near the axially outer edge of the main rib zone 12, and the shoulder wear tends to occur.

If the axial distance Le is more than 5% of the axial distance Wt and the axial edge of the second belt ply 7B is axially outside the axially outer edge 12e, since the axial edge of the second belt ply 7B is very close to the outer surface of the sidewall portion 3, there is a possibility that a separation failure starts from the axial edge of the second belt ply 7B.

Comparison Tests

Heavy duty tires of size 11R22.5 (rim size 22.5×8.25) having the internal structure shown in FIG. 1 were prepared and tested for the uneven wear resistance.

All of the tires had substantially same specifications except for the specifications shown in Table 1.

The rubber compound 21 of the high elastic modulus rubber layer 15 had a complex elastic modulus $E^*1$ of 5.6 MPa and a loss tangent of 0.115.

The rubber compound 20 of the cap tread rubber 2GU excepting the high elastic modulus rubber layer 15 had a complex elastic modulus $E^*2$ of 5.2 MPa and a loss tangent of 0.075.

In the test, the tires were installed on long-distance coaches (tire pressure 800 kPa) and run for 50,000 km.

Then, the shoulder rib areas were visually checked for shoulder wear and step wear and evaluated into five ranks. The results are shown in Table 1, wherein the higher the rank number, the better the resistance to wear.

Further, the average running distance per one liter of light diesel oil was obtained from five coaches per each kind of test tire. The results are indicated in Table 1 by an index based on Embodiment tire Ex.1 being 100, wherein the larger the index number, the better the fuel consumption performance,

TABLE 1

| Tire | Ex. A1 | Ex. A2 | Ex. A3 | Ex. A4 | Ex. A5 | Ref. A1 | Ref. A2 | Ex. B1 | Ex. B2 | Ref. B1 | Ref. B2 |
|---|---|---|---|---|---|---|---|---|---|---|---|
| average ground pressure P1A/P1B | 0.90 | 0.87 | 0.93 | 0.95 | 0.85 | 0.80 | 0.98 | 0.90 | 0.90 | 0.90 | 0.90 |
| sub rib zone width W2/Wr | 0.15 | 0.15 | 0.15 | 0.15 | 0.15 | 0.15 | 0.15 | 0.05 | 0.20 | 0.25 | 0.03 |
| high elastic modulus rubber layer thickness Ta/T | 0.33 | 0.33 | 0.33 | 0.33 | 0.33 | 0.33 | 0.33 | 0.33 | 0.33 | 0.33 | 0.33 |
| width W1a/W1 | 0.5 | 0.5 | 0.5 | 0.5 | 0.5 | 0.5 | 0.5 | 0.5 | 0.5 | 0.5 | 0.5 |
| sub groove depth D1/D2 | 0.8 | 0.8 | 0.8 | 0.8 | 0.8 | 0.8 | 0.8 | 0.8 | 0.8 | 0.8 | 0.8 |
| distance (d) (mm) | 2.5 | 2.5 | 2.5 | 2.5 | 2.5 | 2.5 | 2.5 | 2.5 | 2.5 | 2.5 | 2.5 |
| distance Le/Wt (%)*1 | −2 | −2 | −2 | −2 | −2 | −2 | −2 | −2 | −2 | −2 | −2 |
| resistance to step wear | 5 | 5 | 5 | 4 | 5 | 5 | 3 | 5 | 5 | 3 | 3 |
| resistance to shoulder wear | 5 | 5 | 5 | 5 | 4 | 3 | 5 | 5 | 5 | 3 | 4 |
| fuel consumption performance | 100 | 100 | 100 | 100 | 100 | 100 | 100 | 100 | 100 | 100 | 100 |

| Tire | Ex. C1 | Ex. C2 | Ex. C | Ex. C4 | Ref. C1 | Ref. C2 | Ex. D1 | Ex. D2 | Ex. D3 | Ex. D4 | Ref. D1 | Ref. D2 |
|---|---|---|---|---|---|---|---|---|---|---|---|---|
| average ground pressure P1A/P1B | 0.90 | 0.90 | 0.90 | 0.90 | 0.90 | 0.90 | 0.90 | 0.90 | 0.90 | 0.90 | 0.90 | 0.90 |
| sub rib zone width W2/Wr | 0.15 | 0.15 | 0.15 | 0.15 | 0.15 | 0.15 | 0.15 | 0.15 | 0.15 | 0.15 | 0.15 | 0.15 |
| high elastic modulus rubber layer thickness Ta/T | 0.30 | 0.50 | 0.10 | 0.35 | 0.60 | 0.08 | 0.33 | 0.33 | 0.33 | 0.33 | 0.33 | 0.33 |
| width W1a/W1 | 0.50 | 0.50 | 0.50 | 0.50 | 0.50 | 0.50 | 0.45 | 0.55 | 0.60 | 0.30 | 0.65 | 0.25 |
| sub groove depth D1/D2 | 0.8 | 0.8 | 0.8 | 0.8 | 0.8 | 0.8 | 0.8 | 0.8 | 0.8 | 0.8 | 0.8 | 0.8 |
| distance (d) (mm) | 2.5 | 2.5 | 2.5 | 2.5 | 2.5 | 2.5 | 2.5 | 2.5 | 2.5 | 2.5 | 2.5 | 2.5 |
| distance Le/Wt (%)*1 | −2 | −2 | −2 | −2 | −2 | −2 | −2 | −2 | −2 | −2 | −2 | −2 |
| resistance to step wear | 5 | 5 | 4 | 5 | 4 | 3 | 5 | 5 | 5 | 4 | 3 | 3 |
| resistance to shoulder wear | 5 | 5 | 4 | 5 | 3 | 3 | 5 | 5 | 5 | 5 | 4 | 3 |
| fuel consumption performance | 100 | 100 | 100 | 98 | 90 | 100 | 100 | 100 | 98 | 100 | 90 | 100 |

| Tire | Ex. E1 | Ex. E2 | Ref. E1 | Ref. E2 | Ex. F1 | Ex. F2 | Ref. F1 | Ref. F2 | Ex. G1 | Ex. G2 | Ref. G1 | Ref. G2 |
|---|---|---|---|---|---|---|---|---|---|---|---|---|
| average ground pressure P1A/P1B | 0.9 | 0.9 | 0.9 | 0.9 | 0.9 | 0.9 | 0.9 | 0.9 | 0.9 | 0.9 | 0.9 | 0.9 |
| sub rib zone width W2/Wr | 0.15 | 0.15 | 0.15 | 0.15 | 0.15 | 0.15 | 0.15 | 0.15 | 0.15 | 0.15 | 0.15 | 0.15 |
| high elastic modulus rubber layer thickness Ta/T | 0.33 | 0.33 | 0.33 | 0.33 | 0.33 | 0.33 | 0.33 | 0.33 | 0.33 | 0.33 | 0.33 | 0.33 |
| width W1a/W1 | 0.5 | 0.5 | 0.5 | 0.5 | 0.5 | 0.5 | 0.5 | 0.5 | 0.5 | 0.5 | 0.5 | 0.5 |
| sub groove depth D1/D2 | 0.6 | 1.0 | 0.5 | 1.2 | 0.8 | 0.8 | 0.8 | 0.8 | 0.8 | 0.8 | 0.8 | 0.8 |
| distance (d) (mm) | 2.5 | 2.5 | 2.5 | 2.5 | 1.5 | 3.5 | 1.0 | 4.0 | 2.5 | 2.5 | 2.5 | 2.5 |
| distance Le/Wt (%)*1 | −2 | −2 | −2 | −2 | −2 | −2 | −2 | −2 | −5 | +5 | −10 | +10 |

| TABLE 1-continued | | | | | | | | | | | | |
|---|---|---|---|---|---|---|---|---|---|---|---|---|
| resistance to step wear | 5 | 5 | 3 | 3 | 5 | 5 | 3 | 4 | 5 | 5 | 3 | 3 |
| resistance to shoulder wear | 5 | 5 | 3 | 3 | 5 | 5 | 5 | 3 | 5 | 5 | 3 | 3 |
| fuel consumption performance | 100 | 100 | 100 | 100 | 100 | 100 | 100 | 100 | 100 | 100 | 100 | 100 |

*1)–(minus) sign means the axial edge of the second belt ply positioned axially inside the axially outer edge of the main rib zone. +(plus) sigh means the axial edge of the second belt ply positioned axially outside the axially outer edge of the main rib zone.

REFERENCE SIGNS LIST 2 tread portion
2S tread face
3 sidewall portion
4 bead portion
5 bead core
6 carcass
7 belt
7A first belt ply
7B second belt ply
10 main groove
10s shoulder main groove
11 sub groove
12 main rib zone
12e axially outer edge of main rib zone
13 sub rib zone
15 high elastic modulus rubber layer
Te tread edge
Yc crown area
Ys shoulder rib area
X virtual tread surface

The invention claimed is:

1. A heavy duty tire comprising
a carcass extending between bead portions through a tread portion and sidewall portions, and
a belt disposed radially outside the carcass in the tread portion and composed of a plurality of belt plies including a radially innermost first belt ply and a widest second belt ply disposed on the radially outside of the first belt ply,
the tread portion provided with a plurality of circumferentially-extending main grooves including an axially outermost shoulder main groove disposed on each side of the tire equator to define a shoulder rib area between said shoulder main groove and the adjacent tread edge, and a crown area between the axially outermost shoulder main grooves, and
the shoulder rib area is provided with a sub groove extending straight in the tire circumferential direction at an axial distance of 0.05 to 0.2 times the axial width Wr of the shoulder rib area from the tread edge so as to subdivide the shoulder rib area into a main rib zone axially inside the sub groove and a sub rib zone axially outside the sub groove, wherein
the main rib zone is provided with a high elastic modulus rubber layer extending along the axially outer edge of the main rib zone to form a part of the tread face and made of rubber having an elastic-modulus higher than that of rubber forming the tread face except for said part of the tread face,
the axial width (W1a) of the high elastic modulus rubber layer is 0.3 to 0.6 times the axial width (W1) of the main rib zone,
the thickness (Ta) of the high elastic modulus rubber layer is 0.1 to 0.5 times a radial distance (T) from the axially outer edge of the main rib zone to the axial edge of the second belt ply, and
under such a condition that the tire mounted on a standard wheel rim, inflated to a standard pressure and load with a standard load is placed on a horizontal plane at a camber angle of 0 degree, an average ground pressure (P1A) of the high elastic modulus rubber layer is in a range of 0.85 to 0.95 times an average ground pressure (P1B) of the crown area.

2. The heavy duty tire according to claim 1, wherein the depth (D1) of the sub groove is in a range of 0.6 to 1.0 times the depth (D2) of the shoulder main groove.

3. The heavy duty tire according to claim 1 or 2, wherein the radially outer surface of the sub rib zone extends parallel with a virtual tread surface while keeping a distance (d) of 1.5 to 3.5 mm radially inwardly from the virtual tread surface, wherein the virtual tread surface is defined as an extension of the radially outer surface of the main rib zone.

4. The heavy duty tire according to claim 1, wherein the axial distance (Le) between the axially outer edge of the main rib zone and the axial edge of the second belt ply is not more than 5% of the axial distance (Wt) between the axially outer edge of the main rib zone and the tire equator.

* * * * *